(No Model.) 4 Sheets—Sheet 1.
W. F. CARR & C. F. FERRIN.
CONDUIT FOR ELECTRIC RAILWAYS.
No. 476,128. Patented May 31, 1892.
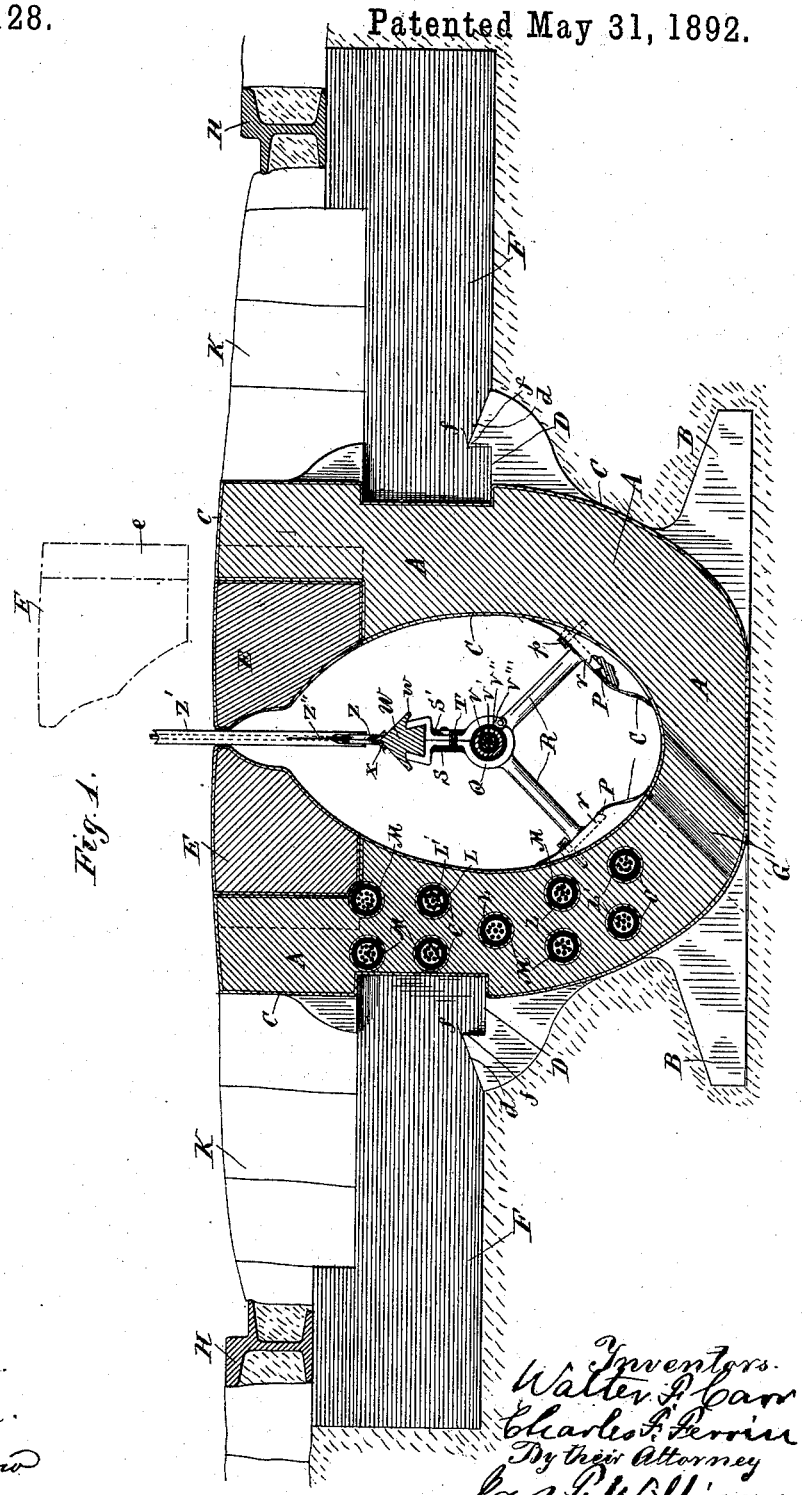
Witnesses.
A. H. Opsahl.
Winfield Snow.
Inventors.
Walter F. Carr
Charles F. Ferrin
By their Attorney
Jas. F. Williamson

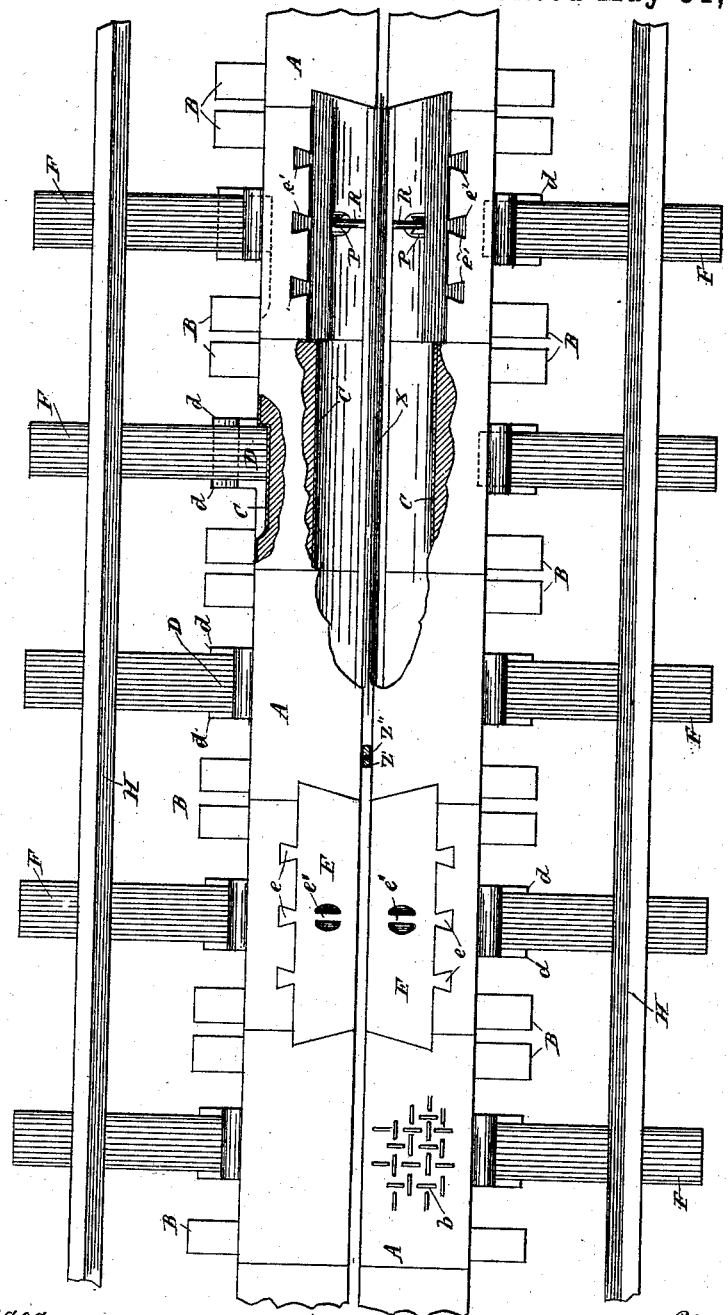

(No Model.) 4 Sheets—Sheet 3.
W. F. CARR & C. F. FERRIN.
CONDUIT FOR ELECTRIC RAILWAYS.
No. 476,128. Patented May 31, 1892.
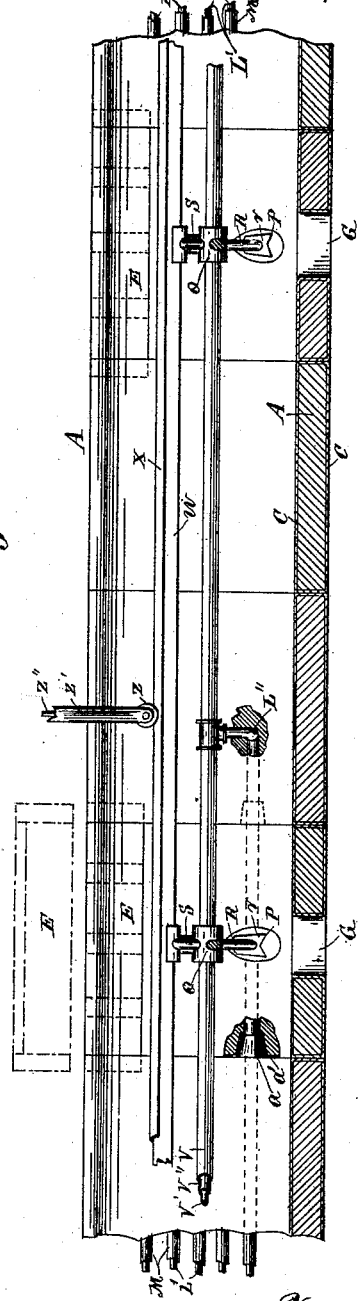
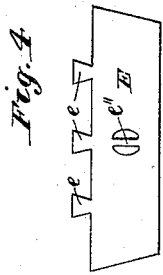
Witnesses.
A. H. Opsaht.
Winifred Snow
Inventors.
Walter F. Carr
Charles F. Ferrin
By their Attorney.
Jas. F. Williamson (No Model.) 4 Sheets—Sheet 4.
W. F. CARR & C. F. FERRIN.
CONDUIT FOR ELECTRIC RAILWAYS.
No. 476,128. Patented May 31, 1892.
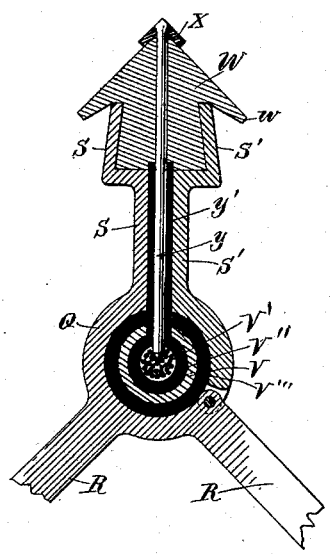
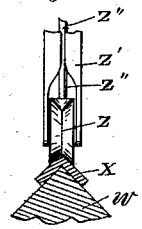
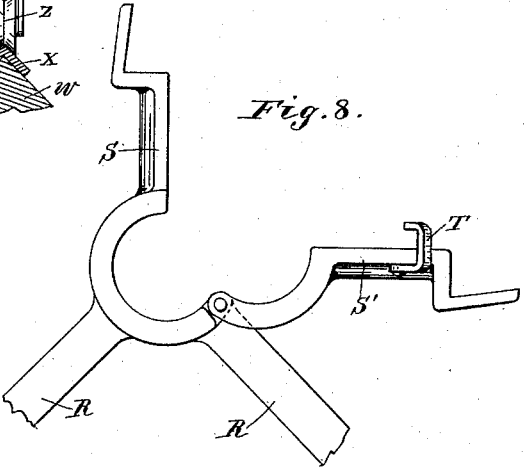
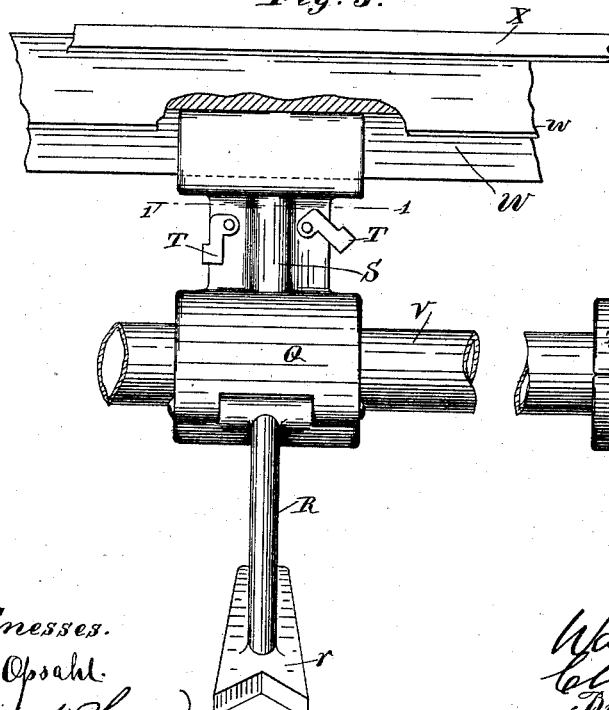
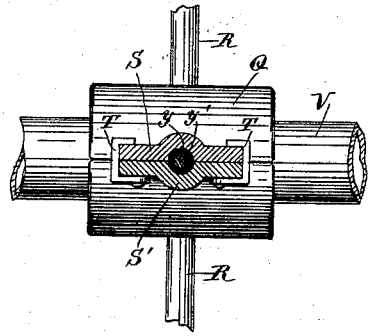
Witnesses.
Inventors.
By their Attorney.

UNITED STATES PATENT OFFICE.

WALTER F. CARR AND CHARLES F. FERRIN, OF MINNEAPOLIS, MINNESOTA.

CONDUIT FOR ELECTRIC RAILWAYS.

SPECIFICATION forming part of Letters Patent No. 476,128, dated May 31, 1892.

Application filed August 6, 1891. Serial No. 401,824. (No model.)

*To all whom it may concern:*

Be it known that we, WALTER F. CARR and CHARLES F. FERRIN, citizens of the United States, residing at Minneapolis, in the county of Hennepin and State of Minnesota, have invented certain new and useful Improvements in Conduit Systems of Surface Electric Street-Railways; and we do hereby declare the following to be a full, clear, and exact description of the invention, such as will enable others skilled in the art to which it appertains to make and use the same.

Our invention relates to conduit systems of surface electric street-railways.

Our improvements relate especially to the conduit and track structures, the electric conductors and supports for the same, and the trolley-contacts.

The material employed for the conduit is fire-clay, concrete, terra-cotta, or other similar material. This material is kiln-dried, and all exposed surfaces are covered with a salt-glazing. The advantage of using this kind of material is that we thereby obtain a conduit composed of insulating material, which is also very durable, and when covered, as above stated, with a salt-glazing, will not absorb moisture. It is not subject to disintegration under the action of the acids of the earth, and on account of the absence of moisture from its interior structure it is free from disturbance on account of frost. It also has large crushing-strength, and when properly formed will sustain any load to which it is liable to be subjected. The material is molded into sections of the proper form, of a size for convenient handling, and the separate sections are united in the trench by telescoping joints to form the continuous conduit. The joints are preferably cemented over and glazed to make the sealing and insulation of the conduit complete.

The interior opening or conduit proper is of a sharply oval or elliptical form, and the walls of the same are kept as free as possible from shoulders or projections of any kind, with a view of perfect clearance, so as to prevent the lodgment of dust, dirt, water, snow, ice, or other material which may fall into the same through the slot. Hence all the material which enters the opening through the slot or otherwise will fall directly to the bottom of the conduit and be washed into the sewer, with which the conduit is connected at suitable intervals. The conduit-walls extend flush with the street-surface, and the top portions of the conduit are roughened to give a good traffic surface. Certain of the sections of the conduit, as near each other as may be necessary or desirable for the location of the supports for the conductors, are provided on their interior walls with seats for the feet of the conductor-supports, and are constructed with detachable or removable arch or slot sections, which fit into shoulders or rabbeted seats of the side walls. These arch blocks are locked or secured to the main walls of the conduit by suitable lugs and lug-seats, which serve to hold the arch blocks in proper position and prevent their downward displacement to close the slot. On the upper surface the arch blocks are provided with a staple or other means adapted to be engaged by a hook or other device for their convenient removal. In addition to holding the arch blocks in their proper position, the lugs and lug-seats serve to guide the blocks into the proper alignment when they are being placed into position. These lugs and lug-seats may be of any suitable form and arrangement. We have shown the lugs on the blocks and the seats in the walls, and preferably make such of them as resist the downward strain of dovetail form. These removable arch blocks afford a convenient and cheap means of access to the interior of the conduit for construction, cleaning, repairing, or other purposes.

Each section of the conduit is provided with laterally-extended portions constituting its base and on the exterior of the side walls with seats for the inner ends of the track-ties. These tie-seats may be formed by either cutting out a part from the body of the wall or by forming the wall with an enlarged portion at that point suitably recessed to receive the tie. The material point is to have the necessary bearings and shoulders and that the seat be constructed in such a way as to uphold the tie against downward strain and also to prevent the endwise displacement of the same. To better secure this latter result, we preferably notch the under side of the tie near its inner end and provide a projection or lug on the wall, the upper and outer edge of which is formed to fit the said notch to hold the tie in position. The tie-seats are open at one end, so as to permit the insertion of the tie by sliding the same lengthwise in the conduit. When the ties are placed in position in this way and the track-rails are placed on the ties, the entire structure is bound together, so that there is no possibility of disturbing the relative planes of the track-rails and the slot. The space between the rails and the walls of the conduit, which extend flush with the face of the street, as before stated, are filled with the ordinary paving-blocks in the usual way.

The side walls of the conduit may be utilized for the feed-wires by providing the same with longitudinal holes and suitable insulating material. In addition to the feed-wire, we employ what, for distinction, we call the main wire or conductor and a trolley strip or conductor, both of which are supported in the open space of the conduit proper. Our preferred form of support is constructed in the form of a three-part bracket, the center or hub of which is hollow for passing and holding the main wire with its insulating material. The legs of the bracket are oval or triangular in cross-sections with the point or ridge uppermost, so as to readily shed everything which may strike it, and at their lower ends terminate in expanded flanges or feet, which rest in the seats provided for them, as before noted, on the walls of the conduit, and are secured thereto by a bolt or in any other suitable way. After having been placed in position the feet or flanges of the support and the seat for the same is cemented over and glazed as in the case of the joints of the sections of the conduit. The head portion of the support is divided on its median vertical line to form clamping-jaws, one part being formed integral with the hub and the other hinged thereto and provided with suitable clamps or other devices for locking the same in its uppermost or closed position. This hinged portion provides a ready means for placing the main wire in position or removing the same, as may be desired. The extremities of these two upper parts of the support are offset or shouldered to form between the same a seat for a wooden stringer secured therein by the clamping action of these jaws and upheld by the support. The wooden stringer is of angular form terminating in a ridge, and its sides or eaves project down over the ends of the jaws of the support, so as to shed the water beyond the reach of the same. On the ridge of this wooden stringer we place the trolley-wire proper, which we construct, preferably, of copper and of V shape to fit the cap of the ridge, securing the same thereto by copper screws, studs, or nails. At each support the wooden stringer is provided with a vertical hole, through which and the hollow central space between the two jaws of the support extends a vertical rod or wire, which is soldered at the upper end to the strip and fitted with close contact at its lower end into a suitable seat formed in the body of the main wire. It is of course suitably insulated from the body of the support. The trolley-wheel is of V shape, fitting the V-shaped trolley-strip, thus affording a large contact, and is carried by a trolley pole or blade of any suitable construction, passing up through the slot. The current may be taken from the trolley-wheel in any suitable way. We have shown for the purpose a rod passing down through the interior of the pole and terminating in a conical head fitting the groove of the trolley-wheel.

The feed-wire, as before stated, is carried in the walls of the conduit, and it is tapped wherever desired by direct connection from the main wire to the same through an opening in the wall of the conduit. The union may be effected with the main wire by an ordinary stock-fitting; or if a cable be employed an ordinary solder and wipe joint may be used. The return-conductors may be the rails, with or without supplementary wires.

The main wire may of course be carried in a gas-pipe or in a lead cable, or in any of the well-known standard ways, as may be found most desirable. Between the lead or gas pipe sheathing and the hub of the support we place some suitable insulating material, such as vulcanite, red fiber, or other material. We preferably use the same sort of insulating material for the contact-rods connecting the main wire and the trolley-strip and also for the feed-wires in the holes of the conduit.

Our invention is illustrated in the accompanying drawings, wherein like letters refer to like parts throughout.

In the drawings, Figure 1 is a transverse vertical section through the conduit and trackway. Fig. 2 is a plan view of a portion of the trackway and conduit, some parts being broken away and others removed. Fig. 3 is a vertical longitudinal section taken in the plane of the slot and to one side of the supports. Fig. 4 is a plan view of one of the arch blocks detached. Fig. 5 is a side elevation of one of the supports and some of its immediately-connected parts detached. Fig. 6 is a cross-section of the same on the line 1 1 of Fig. 5. Fig. 7 is a vertical section through a part of one of the conductor-supports, and Fig. 8 is a front elevation of the same with the pivoted member of the clamping-jaws in its open position. Fig. 9 is a detail of the trolley and trolley-pole contact.

A represents the body of one of the sections of the conduit, and $a\ a'$ represent, respectively, projections and holes or seats on the opposite ends of the sections, the said parts fitting together with a telescoping action to effect the joint between adjacent sections of the conduit.

B represents the expanded or base portion of one of the sections; C, the layer of salt-glazing covering all exposed parts; D, the tie-seats on the exterior of the side walls; E, the removable slot or arch blocks provided with the lugs e, fitting the corresponding lug-seats e' in the side walls and resting on the rabbeted or shouldered portions of the same and having on their top surface the hand-staples e''.

F are the ties, having the notches f at their inner ends fitting over the corresponding projections d of the tie-seats D.

H are the track-rails; K, the paving-blocks; L, the holes in the conduit for the feed-wires L', and M is the insulating material for the same.

P are the seats on the inner walls of the conduit for the feet of the conductor-support. As shown, the walls are formed with raised portions or projecting parts recessed to form these seats, and the seats proper are of triangular or ridge form in cross-section, and terminate below in a correspondingly-formed angular or ridge-shaped ledge. The feet of the support are correspondingly shaped to fit the seats. The projecting portions forming the seats are rounded, so as to form a good shedding-surface.

Q R S S' represent the conductor-support, of which Q is the hub or hollow central part; R, the legs with the expanded feet r, formed as above described, fitting the seats P and secured thereto by the bolts p, and S S' represent the divided head portion or clamping-jaws, of which S is the fixed member and S' the movable member, having its lower end pivotally connected to the hub.

T are the side clamps carried by the movable member of the jaws, adapted to embrace the fixed member to hold the two together and the other parts in their proper position.

V is the pipe containing the main wire V' within the insulating material V'', and V''' is the outside insulating material between the pipe and the hub of the support.

L'' represents one of the connections from the main wire to one of the feed-wires L'. It should be noted that the connection is made to the main pipe from below to afford better clearance.

W represents the wooden stringer held by the clamping-jaws, provided with the projections or eaves w, overreaching the ends of the jaws to shed the water clear of the same. This trolley-strip holder is made of hard well-seasoned wood, rendered impervious to moisture by paraffine or otherwise, and extends the entire length of the line.

X is the trolley-strip or conductor, and y the vertical contact-rod connecting the same with the main wire, as before described, and insulated from the clamping-jaws by insulating material y'.

Z is the trolley-wheel, Z' the trolley-pole, and Z'' the contact-rod for taking the current from the wheel, as already described.

The top portions of the conduit, which lie flush with the street, are roughened, as shown at b.

G are outlet-openings through the floor of the conduit for sewer connections, one opening being shown under each support. Where laid in streets having a regular sewer system, the outlet openings or escapes may be at greater distances apart; but it is desirable to have them near enough together to avoid any accumulation of water in the bottom of the conduit.

The advantages of the particular features have been stated in the general description.

The general advantages of our system, taken as an entirety, are complete insulation for the conductors, convenience of access for inspection and repair, comparative safety against accidents, low first cost, and durability.

What we claim, and desire to secure by Letters Patent, is as follows:

1. A conduit provided with removable arch blocks spanning the parts of the arch adjacent to the slot-opening, the blocks being detachably secured together and held in working position by lugs and lug-seats, substantially as described.

2. In a street-railway conduit constructed in sections, the combination, with sections having their walls continuous and integral from the slot-opening, of other sections located at suitable intervals provided with removable arch blocks seated in the side walls of the section and spanning the arch adjacent to the slot-opening.

3. The combination, with the track-rails, of the conduit having tie-seats on the exterior of its side walls and the ties having their inner ends resting in the said tie-seats and their outer ends secured to the rails, the said seats and ties being constructed with interlocking parts, so as to prevent endwise displacement of the ties, substantially as described.

4. The combination, with the ties having notches, of the conduit having the tie-seats on the exterior of its side walls provided with openings to receive the end of the ties and with locking lugs or projections adapted to engage the notches on the tie and hold the same in position, substantially as described.

5. In a conduit system of surface electric railways, the combination, with the conduit composed of insulating material, of supports secured to the walls of the conduit, a main wire or conductor secured on and insulated from said supports, a wooden stringer secured to the top of said supports, a trolley wire or conductor on the top of said stringer, and contact-rods or sub-feed-wires passing through said stringer and insulated from said supports connecting the said main conductor and the trolley-conductor, substantially as described.

6. In a conduit system of surface electric railways, the combination, with the conduit, of the main wire or conductor, the trolley wire or conductor, the wooden stringer, and a support for the said stringer and conductors securable to the inner walls of the conduit, having a divided head, the members of which are capable of separation to receive between them the main conductor and the stringer and are capable of being clamped together to secure the said parts in working position, substantially as described.

7. The combination, with the main wire and the wooden stringer for holding the trolley-wire, of supports for the same securable to the inner walls of the conduit, each of which supports is provided with a hollow hub and a pair of clamping-jaws formed continuous therewith, one member of which is pivotally connected to the body of the hub, adapted when in its open position to receive the main wire into its seat on the hub and the wooden stringer onto the half-seat of the other jaw and to hold the said parts in their working position when the jaws are closed and locked together, substantially as described.

8. The combination, with the conduit and the conductor-supports securable thereto, having the clamping-jaws, of the wooden stringer supported by the jaws when in their closed position and provided with projecting eaves overreaching the ends of the jaws for shedding the water clear of the same, substantially as described.

9. The combination, with the conduit, of the supports for the conductors, each of which consists of a three-part bracket having divergent legs securable to the walls of the conduit, each of which is of oval or angular form in cross-section with the ridge of the same uppermost for the better shedding of dust, dirt, water, and other matter.

10. The combination, with the conductor-supports having legs terminating in expanded feet, of the conduit provided with correspondingly-shaped seats to receive the said feet, and means of securing the same thereto, substantially as described.

11. The combination, with the conductor-support having the clamping-jaws, one of which is pivoted, of the side clamps carried by one of the jaws for securing the clamps in their closed position, substantially as described.

In testimony whereof we affix our signatures in presence of two witnesses.

WALTER F. CARR.
CHARLES F. FERRIN.

Witnesses:
JAS. F. WILLIAMSON,
FRANK D. MERCHANT.